United States Patent [19]

Hasegawa

[11] Patent Number: 4,725,325
[45] Date of Patent: Feb. 16, 1988

[54] METHOD OF PRODUCING LAMINATED PLATE

[75] Inventor: Hidenori Hasegawa, Aichi, Japan

[73] Assignee: Meinan Machinery Works Inc., Aichi, Japan

[21] Appl. No.: 839,066

[22] Filed: Mar. 13, 1986

[30] Foreign Application Priority Data

Mar. 19, 1985 [JP] Japan ................... 60-57452
Mar. 19, 1985 [JP] Japan ................... 60-57453
Jul. 25, 1985 [JP] Japan ................... 60-164921

[51] Int. Cl.⁴ ........................... B32B 31/18
[52] U.S. Cl. ......................... 156/254; 156/256; 156/260; 156/264; 156/266; 156/304.5; 156/306.6; 144/346; 144/347; 144/350; 144/351
[58] Field of Search ............... 156/157, 254, 256, 260, 156/264, 265, 266, 304.5, 306.6; 144/344, 345, 346, 347, 350, 351

[56] References Cited

U.S. PATENT DOCUMENTS

| | | | |
|---|---|---|---|
| 3,461,932 | 8/1969 | Shelton et al. | 144/317 |
| 3,686,061 | 8/1972 | Brown et al. | 428/56 |
| 3,963,552 | 6/1976 | Troutner et al. | 156/299 |
| 4,343,667 | 8/1982 | Hollis | 156/157 |
| 4,507,162 | 3/1985 | Iwamoto | 156/157 |

FOREIGN PATENT DOCUMENTS

| | | | |
|---|---|---|---|
| 716852 | 2/1980 | U.S.S.R. | 156/304.5 |
| 783034 | 11/1980 | U.S.S.R. | 156/304.5 |

*Primary Examiner*—Caleb Weston
*Attorney, Agent, or Firm*—Lahive & Cockfield

[57] ABSTRACT

A method of producing a laminated plate comprises the steps of (a) preparing a pair of blocks in each of which a plurality of plate elements overlap each other in an inclined position such that the plate elements have one end portions appearing stepwise at predetermined intervals on one surface of the block and the other end portions appearing flat on the other surface of the block, and (b) interlocking and bonding the two blocks to each other such that the one end portions of the plate elements in one of the blocks and the one end portions of the plate elements in the other block oppose each other in a predetermined positional relationship, whereby a laminated plate opposite major surfaces of which are flat is produced.

4 Claims, 21 Drawing Figures

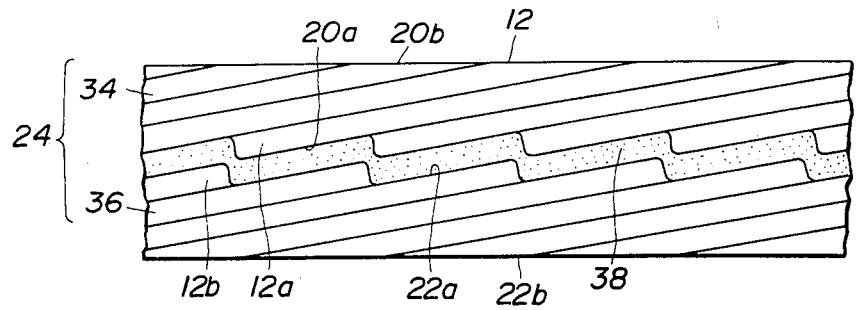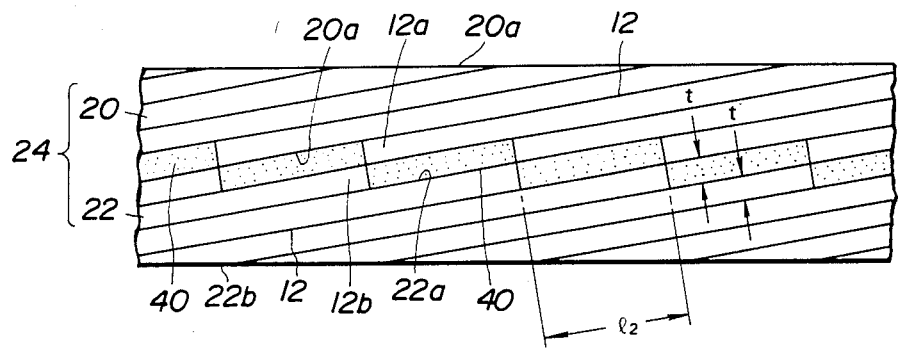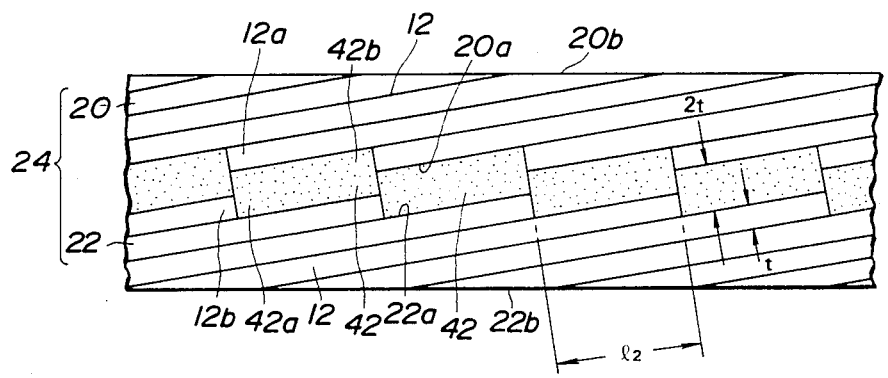

ed in, for example, Japanese Unexamined Patent Publication No. 51-104006. In accordance with the disclosed method, a number of relatively short plate elements are arranged and bonded one after another in a sequentially overlapping configuration and each with an inclination which is calibrated to counteract external forces. Then, opposite end portions of each plate element which appear on both major surfaces of the laminate are cut off so as to finish the major surfaces flat.

METHOD OF PRODUCING LAMINATED PLATE

BACKGROUND OF THE INVENTION

The present invention relates to a method of producing a relatively long laminated plate by use of numerous relatively short plate elements.

A method of producing laminated plates is disclosed in, for example, Japanese Unexamined Patent Publication No. 51-104006. In accordance with the disclosed method, a number of relatively short plate elements are arranged and bonded one after another in a sequentially overlapping configuration and each with an inclination which is calibrated to counteract external forces. Then, opposite end portions of each plate element which appear on both major surfaces of the laminate are cut off so as to finish the major surfaces flat.

The prior art method as stated above successfully produces an elongate laminated plate using relatively short plate elements. However, the yield attainable with such a scheme is limited because the opposite end portions of the plate elements have to be cut away by time-consuming operation. In addition, the mechanical strength of the laminated plate produced by the above procedure is rather poor.

SUMMARY OF THE INVENTION

It is therefore an object of the present invention to provide a method of producing a laminated plate which eliminates the need for a step of cutting off end portions of plate elements and, thereby, enhances the yield of laminated plates.

It is another object of the present invention to provide a method of producing a laminated plate which increases the mechanical strength of a laminated plate.

It is another object of the present invention to provide a generally improved method of producing a laminated plate.

A method of producing a laminated plate of the present invention comprises the steps of (a) preparing a pair of blocks in each of which a plurality of plate elements overlap ech other in an inclined position such that the plate elements have one end portions apearing stepwise at predetermined intervals on one surface of the block and the other end portions appearing flat on the other surface of the block, and (b) interlocking and bonding the two blocks to each other such that the one end portions of the plate elements in one of the blocks and the one end portions of the plate elements in the other block oppose each other in a predetermined positional relationship, whereby a laminated plate opposite major surfaces of which are flat is produced.

BRIEF DESCRIPTION OF THE DRAWINGS

The objects and features of the present invention will become more apparent from the consideration of the following detailed description taken with the accompanying drawings in which:

FIGS. 4 to 21 are views representative of other various embodiments of the present invention.

DESCRIPTION OF THE PREFERRED EMBODIMENTS

While the method of producing a laminated plate of the present invention is susceptible of numerous physical embodiments, depending upon the environment and requirements of use, substantial numbers of the herein shown and described embodiments have been made, tested and used, and all have performed in an eminently satisfactory manner.

Figure 1:
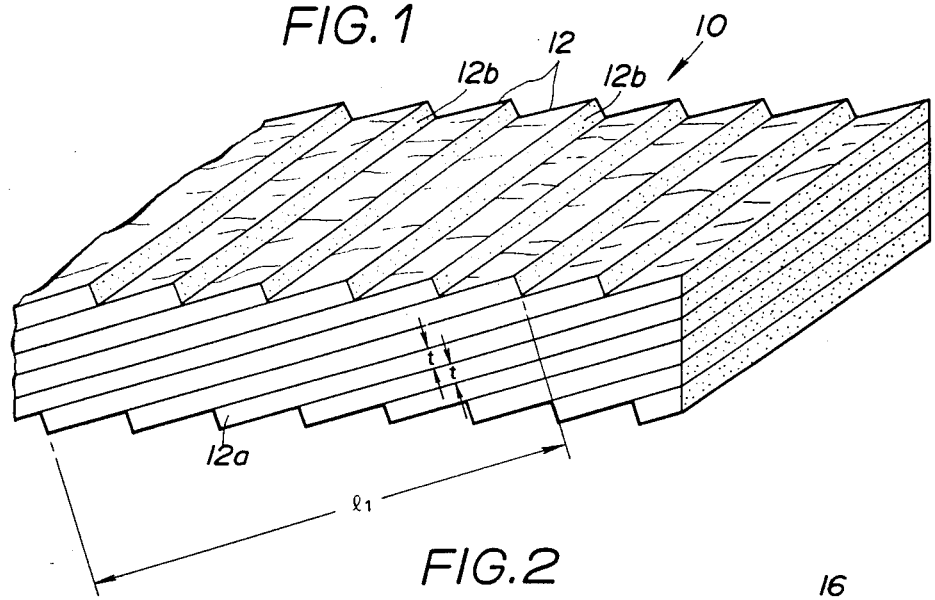
FIG. 1 is a fragmentary perspective view of an aggregate of inclined and overlapping plate elements which is representative of one particular step included in an embodiment of the method of the present invention.

Referring to FIG. 1 of the drawings, there is shown an aggregate 10 of a number of overlapping plate elements 12 which are each inclined at a predetermined angle to the horizontal direction as viewed in FIG. 1. In this particular embodiment as well as others which will follow, the plate elements 12 are assumed to comprise veneers by way of example. The veneers 12 are positioned such that their fibers extend substantially horizontally as viewed in FIG. 1. Each veneer 12 has a length $l_1$ along the fibers and a thickness t. In the aggregate 10, the opposite end portions 12a and 12b of each veneer 12 respectively are spaced in predetermined distance $l_2$ from those of the nearby veneers 12 in the horizontal direction (see FIGS. 2 and 3). Assuming that the veneers 12 have substantially the same thickness, and that the total thickness of a product, or laminated plate, is T (see FIG. 3), the end-to-end distance $l_2$ may be expressed as:

$$l_2 = (l_1 \cdot t)/T$$

While the length $l_1$ of the veneers 12 in most cases are predetermined, the end-to-end distance $l_2$ and the thickness t may each be determined to match them to particular mechanical strength and thickness T which are required of the product.

Figure 2:
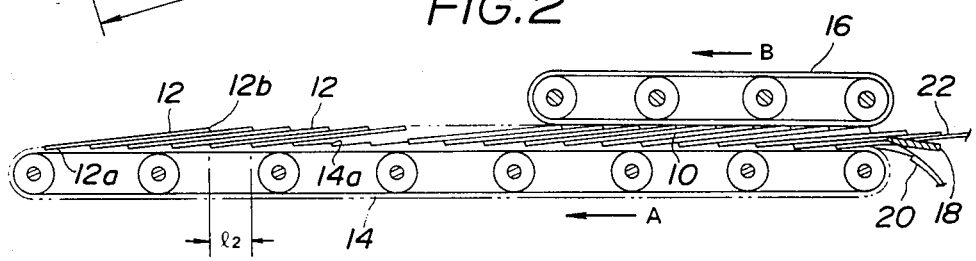
FIG. 2 is a schematic view of a mechanism for implementing the method of the present invention.

Referring to FIG. 2, a mechanical arrangement for preparing and machining the aggregate 10 is shown. The arrangement includes an aligning device 14 having a transport surface which is provided with numerous stepwise support portions, or shoulders, 14a. As shown, each of the shoulders 14a is spaced the previously mentioned distance $l_2$ from nearby ones in an intended direction of plate transport. After adhesive has been applied to a certain area of at least one surface of each veneer 12 which is sufficient to bond the veneer 12 to another, the veneers 12 are sequentially laid on the aligning device 14 such the veneers 12 individually abut against the shoulders 14a at their one end 12a. In this condition, the veneers 12 overlap each other in a predetermined inclined position with the nearby ends 12a and 12b spaced respectively the distance $l_2$ from each other in the horizontal direction. The aligning device 14 is driven as indicated by an arrow A to transport the aligned veneer aggregate 1 toward a pressing device 16. Driven in a direction as indicated by an arrow B, the pressing device 16 sequentially presses the veneers 12 to bond them together. It is to be noted that the veneers 12 do not always have to be completely bonded by means of adhesive and may even be bonded only temporarily. The gist is that the bonding strength be great enough to maintain the veneers 12 in the overlapping configuration as described even when the aggregate 10 is cut as will be described. The pressing device 16 may employ either one of the cold press principle and the hot press principle as the case may be.

A cutting device 18 is located downstream the pressing device 16 with respect to the intended direction of plate transport. The cutting device 18 may be implemented by a knife, a circular saw, a band saw, an oscillation cutting device, etc. As the aggregate 10 is sequentially driven into the cutting station, it is cut by the device 18 at a substantially intermediate point of its thickness in substantially the horizontal direction, i.e., substantially perpendicularly to the thicknesswise direction, with the result that split blocks, or splits, 20 and 22 come out of the cutting station. The split 20 is undulated at one major surface 20a because the end portions 12a of the veneers 12 sequentially appear in steps at the pitchs of $l_2$ in the horizontal direction, while being cut flat at the other major surface 20b (see FIG. 3). Likewise, the split 22 is undulated at one major surface 22a due to the end portions 12b which appear at the same pitches as the end portions 12a while being cut flat at the other major surface 22b. The point of the aggregate 10 which is split by the cutting device 18 is such that the opposite end portions 12a and 12b of the veneers 12 are left uncut on the opposite surfaces of the aggregate and the mechanical strength of a laminated plate is little affected by the thicknesses $t_1$ and $t_2$ (see FIG. 3) of the splits 20 and 22, respectively.

Adhesive is applied to one major surface of one of the two splits 20 and 22. In this particular embodiment, it is assumed to be applied to the surface 20a of the split 20. Then, the split 20 is turned over and mated with the other split 22 in such a positional relationship that the end portions 12a appearing on one surface of the split 20 abut against those 12b appearing on one surface 22a of the other split 22.

Figure 3:
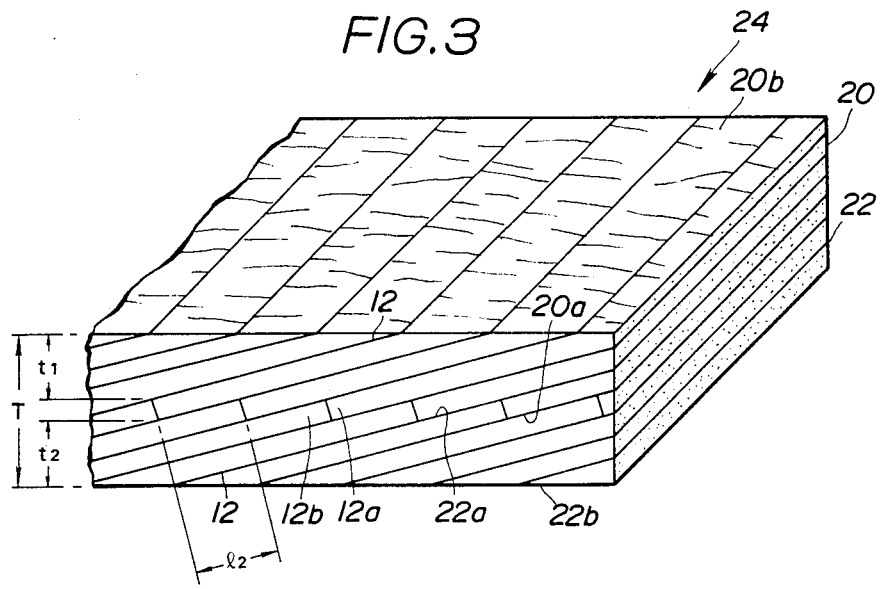
FIG. 3 is a fragmentary perspective view of a laminated plate produced by using the aggregate of FIG. 1.

As shown in FIG. 3, the splits 20 and 22 which are bonded together in the above-stated interlocked position constitute a laminated plate as generally designated by the reference numeral 24. The laminated plate 24 has flat major surfaces and the predetermined thickness T.

The splits, or blocks, 20 and 22 may be produced by any one of three different sequence of steps: one which cuts the aggregate 10 into pieces having a desired length and then splits each of the pieces, one which splits the aggregate 10 into two and then cutting the splits into pieces having a desired length, and one which bonds the splits 20 and 22 to form the laminated plate 24 and then cuts in into pieces having a desired length.

As described above, in accordance with this particular embodiment, the splits 20 and 22 are stacked and bonded together in such a position that the end portions 12a protruding from one surface 20a of the split 20 and those 12b protruding from one surface 22a of the split 22 abut against each other. The end portions 12a and 12b, therefore, cooperate to constitute, so to speak, an intermediate layer of the laminated plate 24 which little influences the mechanical strength of the latter. Further, the end portions 12a and 12b of the veneers 12 are positively and effectively utilized to eliminate the need for the step of cutting them off and, thereby, to enhance the yield as a whole.

Hereinafter, various alternative embodiments of the present invention will be described with reference to FIGS. 4-14. In FIGS. 4-14, the same or similar structural parts and elements will be designated by like reference numerals to avoid redundant description.

Figure 4:
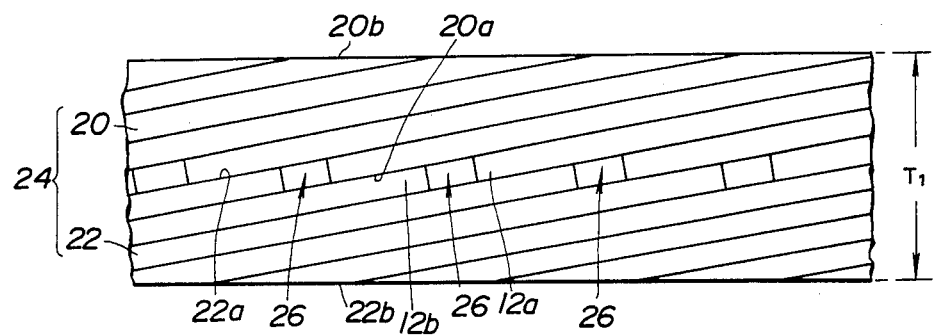

Referring to FIG. 4, a first alternative embodiment of the present invention is shown. As shown, the splits 20 and 22 in the laminated plate 24 are interlocked and bonded in such a manner that spaces 26 are defined between the opposing end portions 12a and 12b of the nearby veneers 12, that is, the opposing end portions 12a and 12b do not abut against each other. In this configuration, the spaces 26 may be calibrated to, for example, increase the total thickness $T_1$ of the laminated plate 24 while decreasing the specific gravity of the same. If desired, the spaces 26 may be filled with an insectcide for adding special value to the product.

Figure 5:
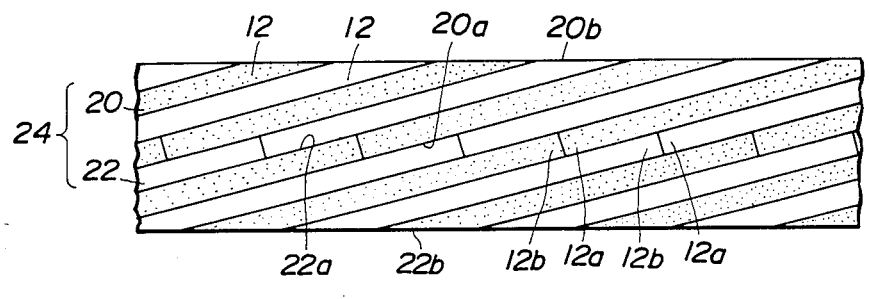

Referring to FIG. 5, another alternative embodiment of the present invention is shown. In this particular embodiment, the veneers 12 in an aggregate (not shown) are arranged such that the fibers of each plate element extend substantially perpendicularly to those of the nearby plate elements. The splits 20 and 22 produced by cutting the so arranged aggregate are mated with the end portions 12a and 12b abutting against each other as stated in relation to the first embodiment, thereby completing the laminated plate 24.

Figure 6:
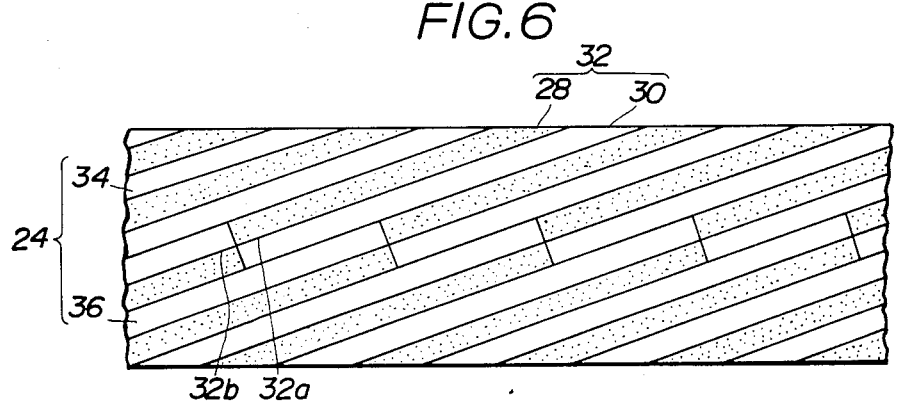

Referring to FIG. 6, another alternative embodiment of the present invention is shown. As shown, a plurality of veneres, two veneers 28 and 30 in this particular embodiment, are combined in such a relative orientation that their fibers extend in different directions, thereby providing a composite veneer 32. A number of such composite veneers 32 are combined in an aggreaget (not shown) and, then, the aggregate is cut into splits, or blocks, 34 and 36. Thereafter, the splits 34 and 36 are interlocked and bonded together with one end portion 32a of the composite veneers 32 and the other end portion 32b which neighbors the end portions 32a abutted against each other.

According to still another embodiment of the invention, a laminated plate shown in FIG. 7 may be obtained as follows: A single continuous plate member is prepared, and is so placed between the splits 34 and 36 that it makes contact with the respective stepwise surfaces 20a and 22a thereof. Then, the whole is pressed together, so that the two opposite surfaces of the middle plate member in contact with the stepwise surfaces 20a and 22a come to generally conform thereto while the former surfaces and the latter surfaces come to closely contact each other, thus bonding together the whole to produce a laminated plate. In this method, the splits 34 and 36 and the single plate member are so orientated that the fibers of the plate member extend in directions perpendicular or parallel to the directions of the fibers of the splits 34 and 36 (although the fibers of the middle plate member 38 extend in the perpendicular directions in the illustrated embodiment).

Referring to FIG. 8, another alternative embodiment of the present invention is shown. As shown, a plurality of intermediate plate members 40 are each interposed between the end portion 12a of one veneer 12 and the end portion 12b of the neighboring veneer 12 which faces the end portion 12a. The intermediate plates 40 hve fibers extending substantially perpendicular to (as in FIG. 8) or in parallel to those of the veneers 12. Each of the plates 40 has a thickness t and a length which is equal to the previously mentioned distance $l_2$ in the direction perpendicular to the fibers of the plate 40. In this structure, the ends 12a of the split 20 face the ends 12b of the split 22 in one-to-one correspondence through the intermediate plates 40.

Referring to FIG. 9, another alternative embodiment of the present invention is shown. In this particular embodiment, a number of intermediate plate members 42 are disposed between the end portions 12a and 12b of the veneers 12 which constitute the splits 20 and 22. The intermediate plates 42 have fibers extending substantially perpendicular to (as in FIG. 9) or parallel to those of the veneers 12. Each of the intermediate plates 42 has a thickness 2t and a length which is equal to the distance $l_2$ in the direction substantially perpendicular to the fibers. In the laminated plate 24, the plates 42 are sequentially arranged to overlap each other in the horizontal direction, forming an intermediate layer. The splits 20 and 22 are mated and bonded together in a predetermined positional relationship in which the ends 12a of the veneers 12 abut against ends 42b of the plates 42 and the ends 12b against ends 42a.

Figure 10:
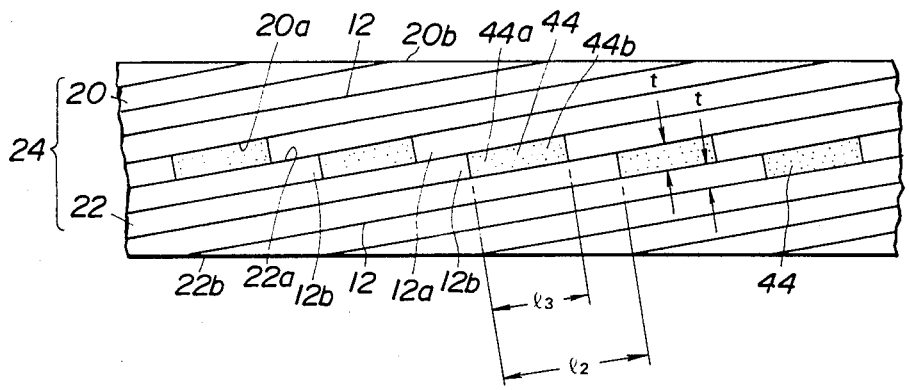

Referring to FIG. 10, another alternative embodiment of the present invention is shown. As shown, intermediate plate members 44 are interposed between opposing ends 12a and 12b of the veneers 12 and oriented such that their fibers extend substantially perpendicular to (as in FIG. 10) or parallel to those of the veneers 12. In this particular embodiment, each of the intermediate plates 44 has the thickness t and a length $l_3$ in the direction substantially perpendicular to the fibers thereof which is shorter than the aforesaid distance $l_2$. The splits 20 and 22 are interlocked and bonded together in a predetermined positional relationship in which the ends 12a of the split 20 and those 12b of the split 22 abut respectively against opposite ends 44b and 44a of their associated intermediate plates 44.

Figure 11:
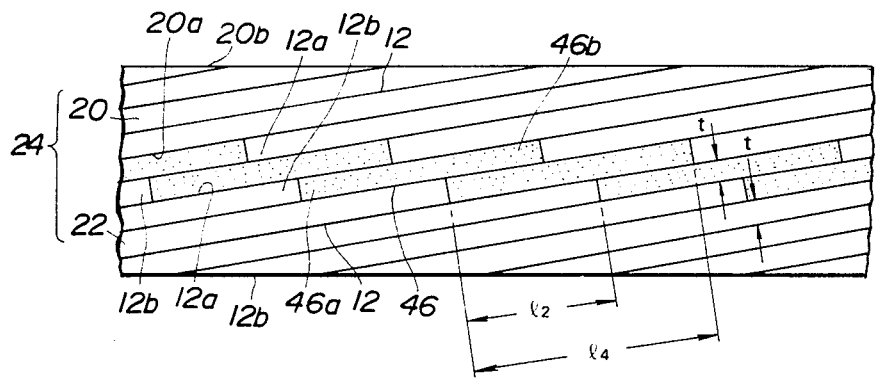

Referring to FIG. 11, another alternative embodiment of the present invention is shown. A plurality of intermediate plate members 46 are sequentially arranged between the ends 12a and 12b of the veneers 12 while overlapping each other and having opposite ends 46a and 46b each spaced the distance $l_2$. The intermediate plates 46 are oriented such that their fibers extend substantially perpendicular to (as in FIG. 11) or parallel to those of the veneers 12. The intermediate plates 46 have the thickness t and a length $l_4$ in the direction substantially perpendicular to their fibers which is greater then the length $l_2$. The splits 20 and 22 are stacked and bonded together in a predetermined positional relationship in which the ends 12a and 12b of the plate elements abut respectively against the ends 46b and 46a of the intermediate plates 46.

Figure 12:
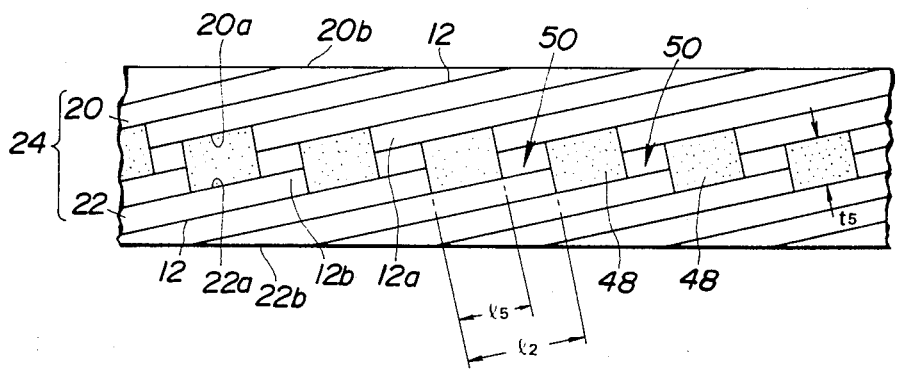

Referring to FIG. 12, another alternative embodiment of the present invention is shown. A plurality of intermediate plates 48 are disposed between the ends 12a and 12b of the veneers 12, which constitute the splits 20 and 22, and oriented such that their fibers extend substantially perpendicular to (as in FIG. 12) or parallel to those of the veneers 12. Each of the intermediate plates 48 has a thickness $t_5$ which is greater than t and a length $l_5$ which is smaller than $l_2$ in the direction substantially perpendicular to the fibers thereof. In this structure, the ends 12a of the veneers 12 in the split 20 and those 12b in the split 22 abut against parts of opposite ends of the plates 48, while spaces 50 are defined between the other parts of the ends of the nearby plates 48.

Figure 13:
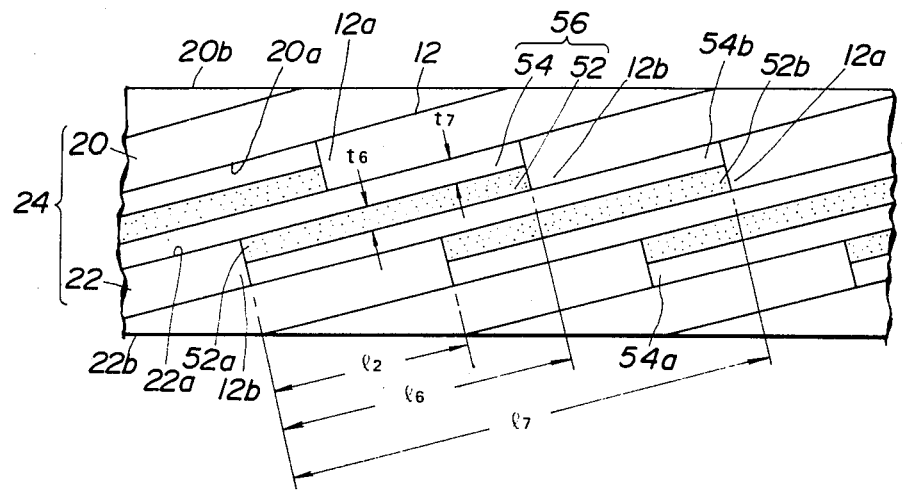

Referring to FIG. 13, another alternative embodiment of the present invention is shown. In this particular embodiment, the laminated plate 24 includes first intermediate plate members 52 and second intermediate plate members 54 which are combined to form composite intermediate plate member pairs 56 and disposed between the ends 12a and 12b of the veneers 12. The first intermediate plates 52 are oriented such that their fibers extend substantially perpendicular to (as in FIG. 13) or parallel to those of the veneers 12. Each plate 52 has a thickness $t_6$ which is smaller than t and a length $l_6$ which is greater than $l_2$ in the direction substantially perpendicular to the fibers of the veneers 12. The second intermediate plates 54, on the other hand, are oriented such that fibers thereof extend substantially perpendicular to those of the first plates 52. One end 54a of each second plate 54 is aligned with one end 52a of one of th immediately neighboring first plates 52 and the other end 54b with the other end 52b of the other first plate 52. The second plates 54 has a length $l_7$ along the fibers which is greater than $l_6$ and a thickness $t_7$ ($t_6+t_7=t$). The first and second plates 52 and 54 are bonded together in the particular position as shown and described. In the laminated plate 24, the end 12b of each veneer 12 in the split 22 abuts against the aligned ends 52a and 54a of the first and second plates 52 and 54, while the end 12a of each veneer 12 in the split 20 abuts against the end 54b of the plate 54 and the end 52b of the plate 52.

In any of the embodiments described above with reference to FIGS. 8 to 13, intermediate plate members are disposed between the ends 12a of the veneers 12 which constitute the split 20 and those which constitute the split 22 in a predetermined positional relationship. Hence, the total thickness T of the laminated plate 24 is variable as desired. In addition, during the production of the laminated plate 24, it is possible to bond the splits 20 and 22 by applying adhesive to at least opposite surfaces of the intermediate plates, so that the procedure for applying adhesive is simplified.

Figure 14:
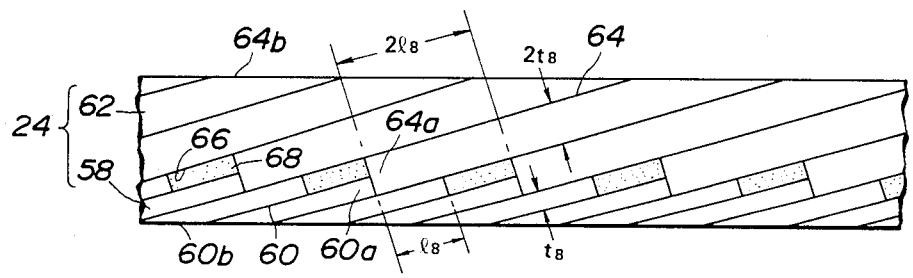

Referring to FIG. 14, another alternative embodiment of the present invention is shown. This particular embodiment is distinguished from the foregoing ones in that the thickness of the veneers 12 which constitute the laminated plate 24 is not uniform. Specifically, the laminated plate 24 shown in FIG. 14 includes a first block 58 made up of veneers 60 each having a thickness $t_8$, and a second block 62 made up of veneers 64 each having a thickness $2t_8$. The thinner veneers 60 have upper end portions 60a which are positioned at predetermined intervals $l_8$ in the horizontal direction as viewed in FIG. 14, and lower end portions 60b which are cut flat at an angle matching with the thickness $t_8$ and distance $l_8$. The thicker plates 64 have lower end portions 64a which are positioned at predetermined intervals $2l_8$ in the horizontal direction, and upper end portions 64b which sequentially overlap each other at an angle matching with the particular thickness $2t_8$ and distance $2l_8$. As shown, when the two blocks 58 and 62 are mated, every other upper end portion 60a abuts against a part of one of the lower end portions 64a which faces it, the other upper end portions 60a defining spaces 66 in cooperation with the other parts of the lower end portions 64a. In this particular embodiment, intermediate plates 68 are received one in each of the spaces 66 and oriented such that their fibers extend substantially perpendicular to those of the veneers 60 and 64.

Figure 15:
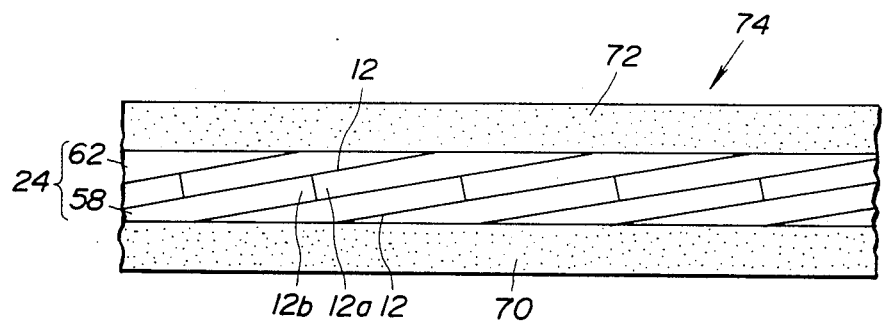

Referring now to FIG. 15, there is shown a specific application of the laminated plate 24 which is constructed as shown in Fig. As shown, a single plate 70 is bonded to the back of the laminated plate 24 and another single plate 72 to the front, each in such an orientation that the fibers thereof extend substantially perpendicular to (as in FIG. 15) or parallel to those of the veneers 12 of the laminated plate 24. In this configuration, the plates 70 and 72 and the laminated plate 24 essentially constitute a three-ply board as generally indicated by the reference numeral 74. Needless to mention, one or both of the plates 70 and 72 may be replaced with other laminated plates.

Figure 16:
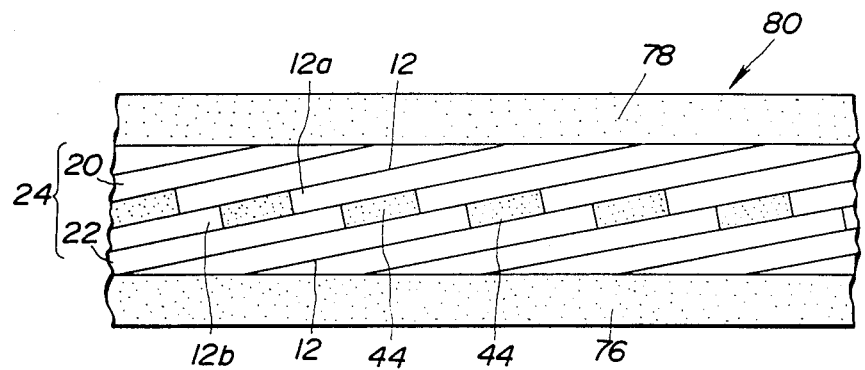

Referring to FIG. 16, a specific application of any of the laminated plates 24 shown in FIGS. 8-14 is presented. In FIG. 16, the laminated wood 24 is assumed to have the structure shown in FIG. 10 by way of example. In this particular example, a single plate 76 is bonded to the back of the laminated plate 24 and another single plate 78 to the front, each in such an orientation that the fibers thereof extend substantially perpendicular to (as in FIG. 16) or parallel to those of the plates 12. The resulting essentially five-ply board is generally designated by the reference numeral 80. Again, one or both of the plates 76 and 80 may be replaced with other laminated plates.

Figure 17:
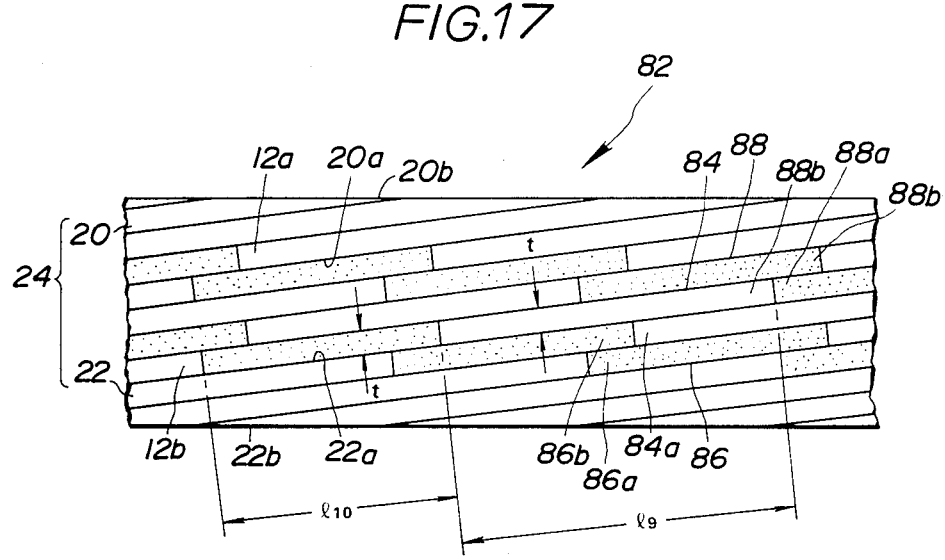

Referring to FIG. 17, another specific application of the laminated plate 24 is shown. Generally, the splits 20 and 22 in FIG. 17 constitute an essentially five-ply board 82 in combination with a group of core veneers 84, a group of first intermediate plates 86, and a group of second intermediate plates 88. The core veneers 84 are oriented such that their fibers extend substantially perpendicular to (as in FIG. 17) or parallel to those of the veneers 12 of the splits 20 and 22. The core veneers 84 have a predetermined length $l_9$ along the fibers thereof and a thickness t and sequentially overlap with opposite ends 84a and 84b positioned at predetermined intervals in the horizontal direction. The first intermediate plates 86 which overlap each other are applied to the back of the core layer 84 in such orientation that their fibers extend substantially perpendicular to (as in FIG. 17) or parallel to those of the core veneers 84. The second intermediate plates 88 also overlapping each other are applied to the front of the core layer 84 in the same orientation as the first plates 86. Both the first and the second intermediate plates 86 and 88 have a length $l_{10}$ along the fibers and a thickness t. The opposite ends 86a and 86b of the intermediate plates 86 and those 88a and 88b of the intermediate plates 88 are each spaced a distance $l_2$ from nearby ones in the horizontal direction as illustrated. The two intermediate plate groups, or intermediate layers, 86 and 88 are bonded to the core layer 84 with their ends 86b and 88a abutted against the ends 84a and 84b, respectively. Thereafter, the split 20 is bonded to the upper surface of the second intermediate layer 88 with its ends 12a interlocked with the ends 88b, while the split 22 is bonded to the lower surface of the first intermediate layer 86 with its ends 12b interlocked with the ends 88a.

Figure 18:
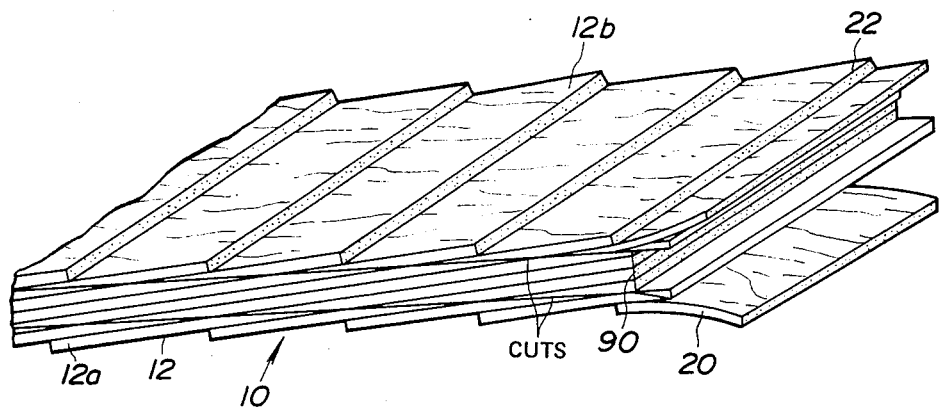

Referring to FIG. 18, there is shown another embodiment of the present invention which cuts the aggregate 10 of veneers into three, instead of two as shown and described in relation to the foregoing embodiments. Specifically, the aggregate 10 shown in FIG. 18 is relatively thick and cut perpendicular to the thickness at those portions, except for the end portions 12a and 12b, which are adjacent to the opposite major surfaces of the aggregate 10. In this condition, a block, or laminated plate, 90 is produced simultaneously with the opposite blocks 20 and 22. The blocks 20 and 22 may be mated and bonded together as in any one of the foregoing embodiments to produce two discrete laminated plates at the same time.

Figure 19:
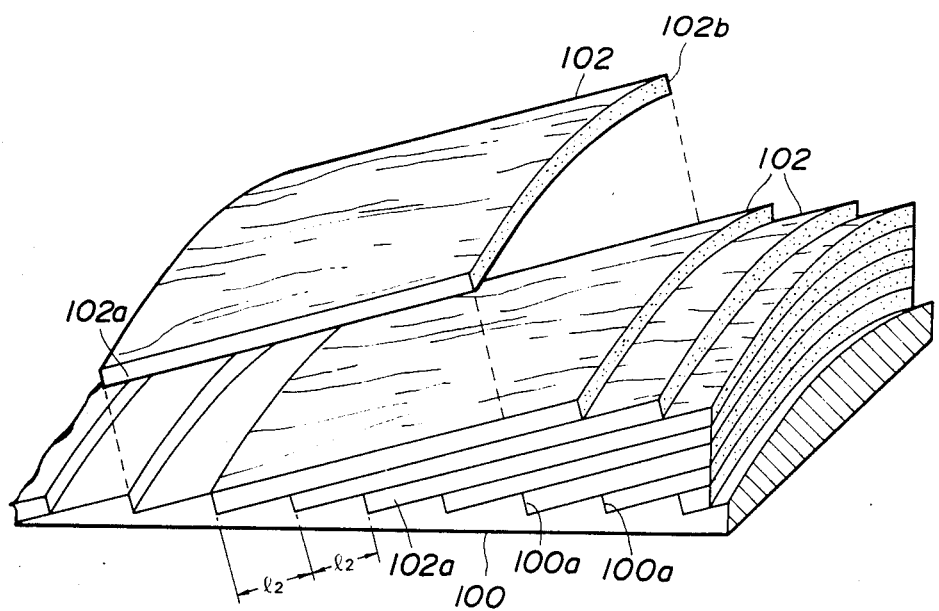
Figure 20:
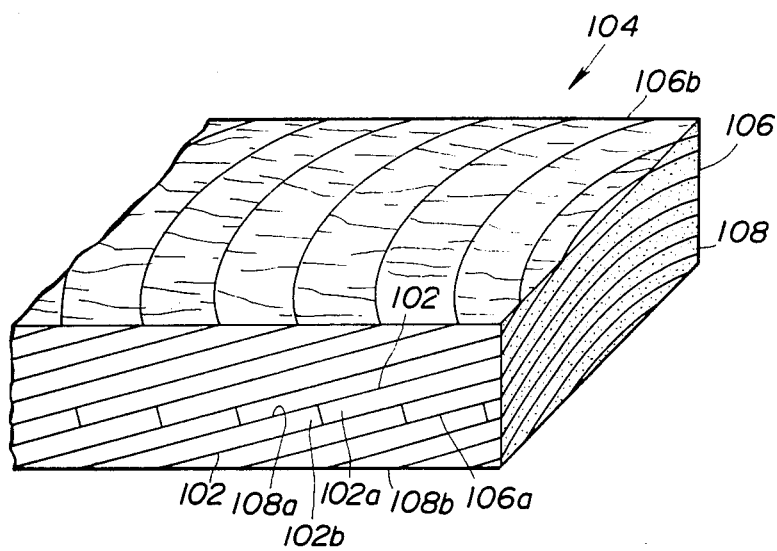

Referring to FIGS. 19 and 20, still another embodiment of the present invention is shown. The major difference of this particular embodiment from the foregoing ones is that the veneers in an aggregate to be machined are not flat but curved. Specifically, as shown in FIG. 19, an aligning device 100 includes a transport surface which is formed with numerous steps, or shoulders, 100a at the previously mentioned predetermined intervals $l_2$ along the intended direction of transport. Each of the shoulders 100a is provided with a predetermined curvature in a direction perpendicular to the transport direction. Meanwhile, adhesive is applied to at least a necessary area of one surface of each of numerous veneers 102 which are fed in an aggregate. The veneers 102 with adhesive are curved at one end 102a thereof to the above-mentioned curvature complementarily to the shoulders 100a and locked to the shoulders 100a one after another to be transported by the aligning device 100. In this manner, the veneers 102 are put one over another with a curvature and at an inclination which is determined by the distance $l_2$ and the thickness t. The veneers 102 are then pressed by a pressing device (not shown) to become a fast aggregate (not shown) which is curved as viewed in a section perpendicular to the transport direction. Thereafter, the aggregate is cut in a direction substantially perpendicular to the thickness of the aggregate and at a substantially intermediate point of the thickness which does not interfere with opposite ends 102a and 102b of the veneers 102, which appear stepwise on the opposite surfaces of the aggregate, and insures desired strength of a product 104. The resulting splits respectively are shown in FIG. 20 and designated by the reference numerals 106 and 108, respectively. The ends 102a and 102b of the veneers 102 are positioned on surfaces 106a and 108a of the splits 106 and 108 each at the previously mentioned intervals $l_2$ along the fibers and with a curvature. The other surfaces 106b and 108b of the splits 106 and 108 which are cut as above stated each extends flat in the horizontal direction.

As shown in FIG. 20, after adhesive has been applied to, for example, one surface 106a of the split 106, the splits 106 and 108 are bonded together in a predetermined positional relationship in which the ends 102a of the veneers 102 appearing on one surface 106a of the split 106 and those 102b appearing on one surface 108a of the split 108 abut against each other or face each other through an intermediate plate or plates. The laminated plate 104 produced by the above procedure has flat major surfaces, i.e. the surfaces 106b and 108b. In this particular embodiment, both the major surfaces 106b and 109b and the opposite cut ends of the plate 104 present unique curved patterns which resemble the rings of a tree, thereby adding special value to the product. In the above mentioned embodiments, the bonding of the splits, with or without an intermediate plate member or members, is made by the application of an adhesive and pressing the splits together, as is commonly done on the art.

Figure 21:
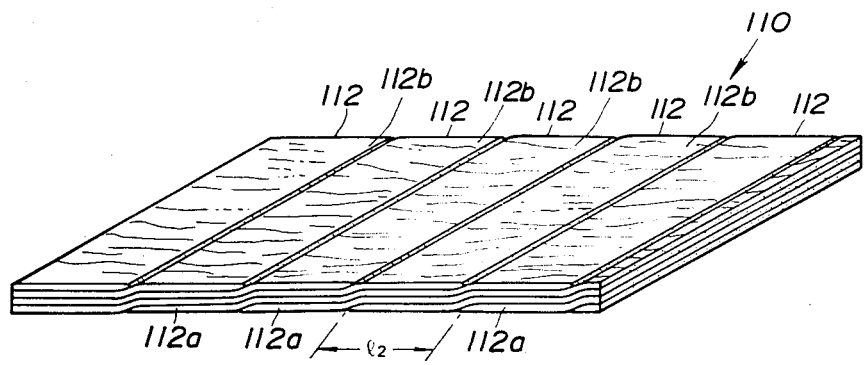

Also, in the foregoing embodiments described above with reference to FIGS. 1-20, the pressing force applied to the aggregate of veneers for bonding the veneers together is relatively weak. Alternatively, as shown in FIG. 21, the pressing force may be increased to such an extent that veneers 112 which constitute an aggregate 110 are bent in the thicknesswise direction to cause their opposite ends 112a and 112b to appear substantially flat each on one surface of the aggregate 110 at the previously stated intervals $l_2$.

While the method of the present invention has been shown and described in relation to plate elements in the form of veneers, it is similarly applicable to various other kinds of plate elements such as sawed plates, wood boards, plaster boards, plastic sheets, metal plates and their combinations.

In summary, it will be seen that the present invention provides a method which produces an elongate laminated plate efficiently with a high yield utilizing even the ends of plate elements heretofore cut off and wasted. Despite that each of the plate elements is short, they are capable of providing a laminated wood which features unprecedented mechanical strength.

Various modifications will become possible for those skilled in the art after receiving the teachings of the present disclosure without departing from the scope thereof.

What is claimed is:

1. A method for producing a laminated plate, comprising the steps of:
    (a) preparing a laminated material which comprises a plurality of boards having substantially the same length and made to overlap one another so as to provide at least one toothed surface for said laminated material which includes a plurality of projections arranged side by side in accordance with predetermined equal pitches, said boards being bonded together at their overlapping portions with an adhesive material;
    (b) cutting said laminated material at at least one portion thereof within a middle section of the thickness direction thereof and in a direction perpendicular to the thickness direction thereof so as to provide at least two laminated blocks, each one of which has one toothed surface and an opposed, smooth surface;
    (c) applying an adhesive material to the toothed surface of at least one of said two laminated blocks;
    (d) placing a first of said two laminated blocks and a second of said two laminated blocks on each other such that said toothed surfaces of the two laminated blocks mate with each other; and
    (e) pressing together the two laminated blocks while said blocks are mated such that said blocks are bonded together to produce a laminated plate having opposed smooth surfaces.

2. A method for producing a laminated plate, comprising the steps of:
    (a) preparing a laminated material which comprises a plurality of boards having substantially the same length and made to overlap one another so as to provide at least one toothed surface for said laminated material which includes a plurality of projections arranged side by side in accordance with predetermined equal pitches, said boards being bonded together at their overlapping portions with an adhesive material;
    (b) cutting said laminated material at at least one portion thereof within a middle section of the thickness direction thereof and in a direction perpendicular to the thickness direction thereof so as to provide at least two laminated blocks, each one of which has one toothed surface and an opposed, smooth surface;
    (c) applying an adhesive material to the toothed surface of at least one of said two laminated blocks;
    (d) placing a first of said two laminated blocks and a second of said two laminated blocks on each other such that said toothed surfaces of the two laminated blocks partially contact each other, with gaps provided therebetween; and
    (e) pressing together the two laminated blocks such that the two blocks are bonded together while maintaining the partial contact between the toothed surfaces thereof to produce a laminated plate having opposed smooth surfaces.

3. A method for producing a laminated plate, comprising the steps of:
    (a) preparing a laminated material which comprises a plurality of boards having substantially the same length and made to overlap one another so as to provide at least one toothed surface for said laminated material which includes a plurality of projections arranged side by side in accordance with predetermined equal pitches, said boards being bonded together at their overlapping portions with an adhesive material;
    (b) cutting said laminated material at at least one portion thereof within a middle section of the thickness direction thereof and in a direction perpendicular to the thickness direction thereof so as to provide at least two laminated blocks, each one of which has one toothed surface and an opposed smooth surface;
    (c) preparing a third laminated block, also having a toothed surface and an opposed smooth surface;
    (d) preparing a single continuous board having two opposed, toothed surfaces;
    (e) applying an adhesive material to at least:
        (i) either the toothed surface of one said blocks or one surface of said single continuous board and
        (ii) either the toothed surface of the other of said laminated blocks, or one opposite surface of said single continuous board;
    (f) placing the two laminated blocks and said single continuous board, relative to one another, in such a manner that said single continuous board is disposed between the two laminated blocks and is in engagement with the respective toothed surfaces thereof at its two opposite surfaces; and
    (g) pressing together the block arrangement of subparagraph (f), such that the two opposite surfaces of said single continuous board generally conform to the respective toothed surfaces of the laminated blocks to produce a laminated plate having two opposite smooth surfaces.

4. A method for producing a laminated plate, comprising the steps of:
    (a) preparing a laminated material which comprises a plurality of boards having substantially the same length and made to overlap one another so as to provide at least one toothed surface for said laminated material which includes a plurality of projections arranged side by side in accordance with predetermined equal pitches, said boards being bonded together at their overlapping portions with an adhesive material;
    (b) cutting said laminated material at at least one portion thereof within a middle section of the thickness direction thereof and in a direction perpendicular to the thickness direction thereof so as to provide at least two laminated blocks, each one of which has one toothed surface and an opposed, smooth surfaces;
    (c) preparing a third laminated block, also having a toothed surface and an opposed smooth surface;
    (d) preparing a plurality of board elements each having, in one direction thereof, a selected dimensional relationship with the pitch as mentioned in step (a);

(e) placing one of the laminated blocks formed by step (b), the third laminated block formed by step (c), and said board elements, relative to one another, such that said board elements are located between said one of the two laminated blocks and said third laminated block in engagement with the respective toothed surfaces of these blocks at two opposite surfaces thereof such that said board elements lie at least partially between the toothed surfaces of these laminated blocks; and (f) bonding together the whole with an adhesive material, while pressing it together, to produce a laminated plate having two opposite smooth surfaces.

* * * * *